April 11, 1950  P. J. McCULLOUGH  2,503,960
CONTROL STRUCTURE FOR ELECTRICALLY HEATED DEVICES
Original Filed Jan. 8, 1943
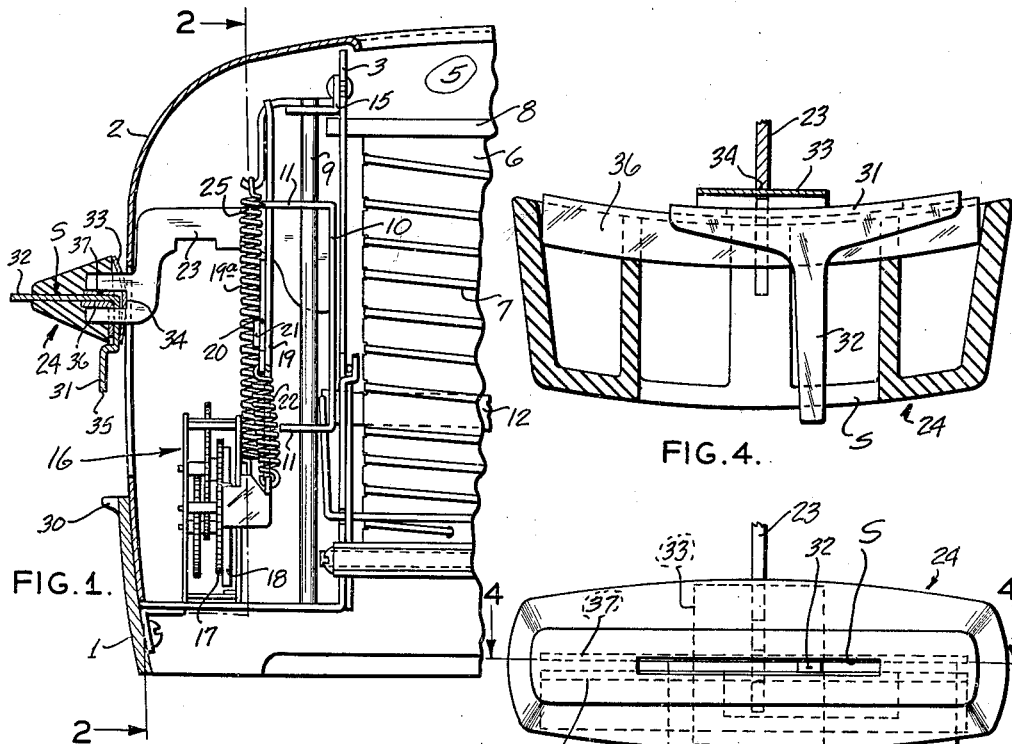
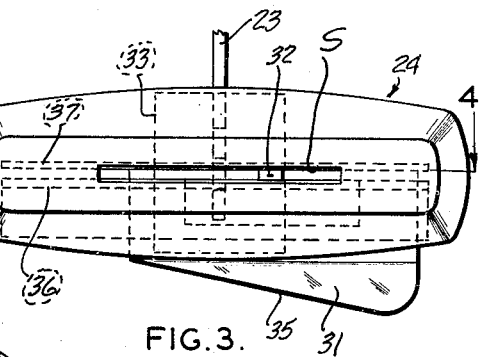
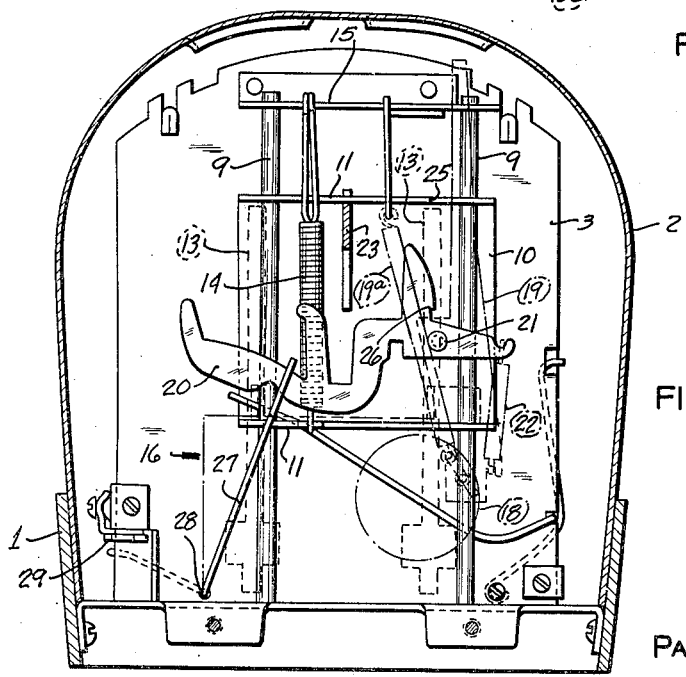
INVENTOR
PAUL J. McCULLOUGH
BY Rodney Bedell
ATTORNEY Patented Apr. 11, 1950

2,503,960

UNITED STATES PATENT OFFICE 2,503,960

CONTROL STRUCTURE FOR ELECTRICALLY HEATED DEVICES

Paul J. McCullough, St. Louis, Mo., assignor, by mesne assignments, to The Toastswell Company, Incorporated, St. Louis, Mo., a corporation of Missouri Original application January 8, 1943, Serial No. 471,686. Divided and this application February 1, 1947, Serial No. 725,853

2 Claims. (Cl. 161—1)

The invention relates to apparatus for controlling the operations of electric toasters or other cookers, and more particularly to such apparatus which is set for a heating operation during a predetermined period only and then acts automatically to terminate the heating operation. This application is a division of a copending application Serial No. 471,686, filed January 8, 1943, by the present inventor.

One object of the invention is to simplify the control of the device by utilizing a single manually operated member for closing the electrical circuit, energizing the timing mechanism and determining the setting of the latter, i. e., the timing period.

The invention is adapted for use on toasters or other cookers wherein the timing period is determined by the extent of movement of an operating handle which energizes the timing mechanism.

Another object is to provide a manually adjustable element on the operating handle to determine the extent of movement of the operating handle and which is visible to the operator in all its positions.

These and other detail objects of the invention as will appear below are attained by the structure shown in the accompanying drawings, which structure is intended to be illustrative and not exclusive of other arrangements embodying the general inventive principles. In these drawings:

Figure 1 is a longitudinal vertical section through the left-hand end of a domestic bread toaster.

Figure 2 is a vertical transverse section through the toaster taken approximately on the line 2—2 of Figure 1, portions of the device being shown in broken lines to more clearly illustrate the structure.

Figure 3 is a detail elevation, drawn to enlarged scale, of the operating handle and associated control element at the left-hand end of the toaster in Figure 1, and Figure 4 is a horizontal section through the operating handle taken approximately on the line 4—4 of Figure 3.

The toaster body includes a base 1, a housing 2 and end plates 3 forming the toasting chamber 5. These parts also comprise framing upon which the resistance heaters, the timing mechanism, the switch and other elements are carried. The body base, housing and end plates may be constructed and assembled as illustrated and described in Patent No. 2,404,915, issued to the present inventor July 30, 1946.

Each of the heating units 6 consists of resistance wires 7 wound upon a sheet of insulation and supported by bars 8 from plates 3. The toaster preferably includes three such units, there being a space between the middle unit and each side unit for a slice of bread to be toasted.

End plate 3 mounts spaced uprights 9, and a channel-shaped carriage 10 has apertured flanges 11 slidable along the uprights. Slice supports 12, rigid with carriage 10, extend through slots 13 in plate 4. A tension coil spring 14 has its lower end secured to the lower flange 11 of carriage 10 and has its upper end anchored to a bracket 15 on plate 3. The spring yieldingly supports the carriage 10 and the parts mounted thereon in the elevated position indicated in Figures 1 and 2.

The timing mechanism unit includes a clock work escapement, indicated generally at 16, which has a main gear 17 driven by a friction disc 18 provided with an arm 19 which carries a latching and trip lever 20 pivoted to the arm at 21 and tilted in a clockwise direction by a tension coil spring 22. A coil spring 19a is anchored to bracket 15 and pulls arm 19 upwardly.

A bracket 23, rigid with carriage 10, extends through a slot in the front wall of the housing and mounts a handle 24 by which the carriage may be moved manually from the elevated position shown in Figure 1 to a lowered position in which a lug 25 on the upper flange 11 of carriage 10 will engage a notch 26 on lever 20 to hold carriage 10 and the parts mounted thereon against upward movement by spring 14 except as permitted slowly by clock work escapement 16 and as released by the tripping of lever 20 by a link 27 pivoted at 28 and slotted to receive the tail of lever 20 and limit its upward movement with carriage 10, thereby swinging notch 26 to the left. Link 27 may be controlled by a thermostat 29 to trip lever 20 at different intervals of time dependent upon the temperature to which the thermostat is subjected. This timing mechanism unit in itself does not constitute the present invention but is illustrated, described and claimed in an earlier Patent No. 2,336,696, issued to the present inventor December 14, 1943.

As carriage 10 is moved manually to lowered position by handle 24, a switch (not shown) closes and energizes heating units 6. When carriage 10 is moved to elevated position by spring 14 at the end of a toasting period, the switch opens and de-energizes heating units 6.

The period during which carriage 10 and the parts mounted thereon moves upwardly before lever 20 is tripped by link 27 depends (aside from the thermostatic positioning of link 27) upon the initial downward movement of the carriage by handle 24. This downward movement is limited by the engagement of a stop 30 on body base 1 by a piece 31 slidable along the rear face of handle 24 and having a horizontal finger 32 projecting through a horizontal slot S extending transversely of the handle. Metal strips 36 and 37 extend into slot S and strip 36 also extends along the rear face of handle 24. The strips provide bearing surfaces for piece 31 and finger 32. A flat spring 33 seated against a shoulder 34 on bracket 23 thrusts piece 31 against the rear face of the handle to frictionally retain the piece in its adjusted position transversely of the handle. The lower edge 35 of piece 31 which engages stop 30 forms a cam surface whereby the downward movement of handle 24 will be varied according to the lateral adjustment of piece 31 on the handle.

The switch is closed and the timing mechanism is energized and the device set for terminating the operation at the end of a predetermined period by the manual manipulation of a single part, namely the handle 24, and the timing period may be varied by an element of this same part, namely finger 32 which is slidable transversely of the handle and visible to the operator in all its positions. In other words, the user needs to observe but a single restricted part of the toaster.

It will be understood that the features referred to may be embodied in devices other than bread toasters and in detailed structure differing substantially from that illustrated and described without departing from the spirit of the invention, and the exclusive use of modifications coming within the scope of the claims is contemplated.

What is claimed is:

1. In a device of the class described, a manually operative handle for initiating operation of the device, a timing mechanism controlled by extended movement of the handle, the timing period being determined by the extent of movement of the handle, a fixed stop to limit movement of the handle, and an adjustable element slidably mounted on the rear face of said handle and having a cam-like surface depending below said handle for engaging said fixed stop, a manually engageable part extending forwardly of the handle for adjusting said element, and a spring-like part urging said element against the rear face of said handle to hold said element in adjustment.

2. A handle for the purpose described comprising a longitudinally slotted housing, an adjustable element slidably mounted on the rear face of said housing and having a cam-like surface extending below said housing, a manually engageable part slidable in the slot in said housing and extending forwardly of said housing to effect adjustment of said element, and a spring-like part urging said element against the rear face of said housing to hold said element in adjustment.

PAUL J. McCULLOUGH.

REFERENCES CITED

The following references are of record in the file of this patent:

UNITED STATES PATENTS

| Number | Name | Date |
| --- | --- | --- |
| 2,293,741 | Lucia | Aug. 25, 1942 |
| 2,332,064 | Duffy | Oct. 19, 1943 |
| 2,336,696 | McCullough | Dec. 14, 1945 |